United States Patent Office 2,792,990
Patented May 21, 1957

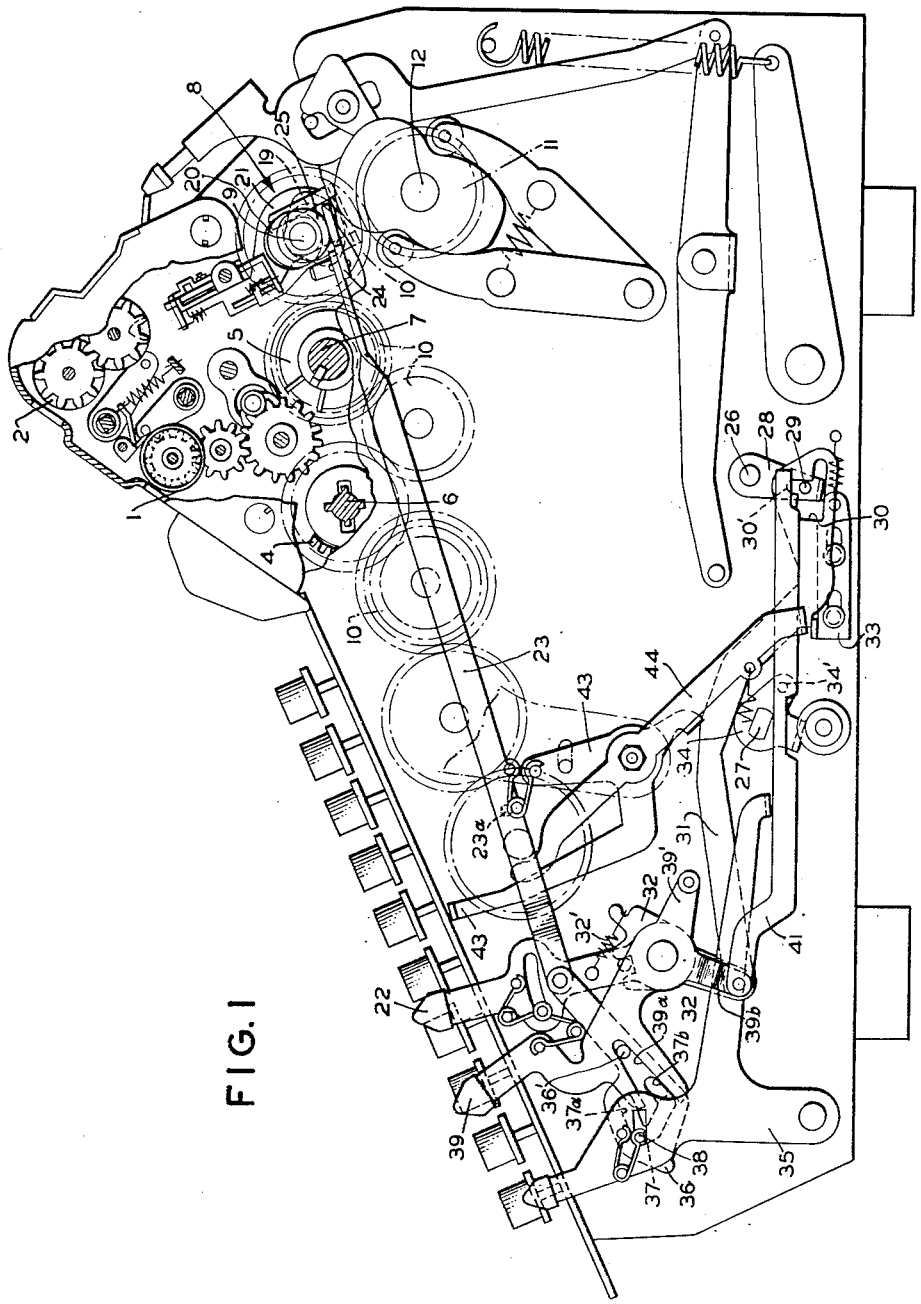

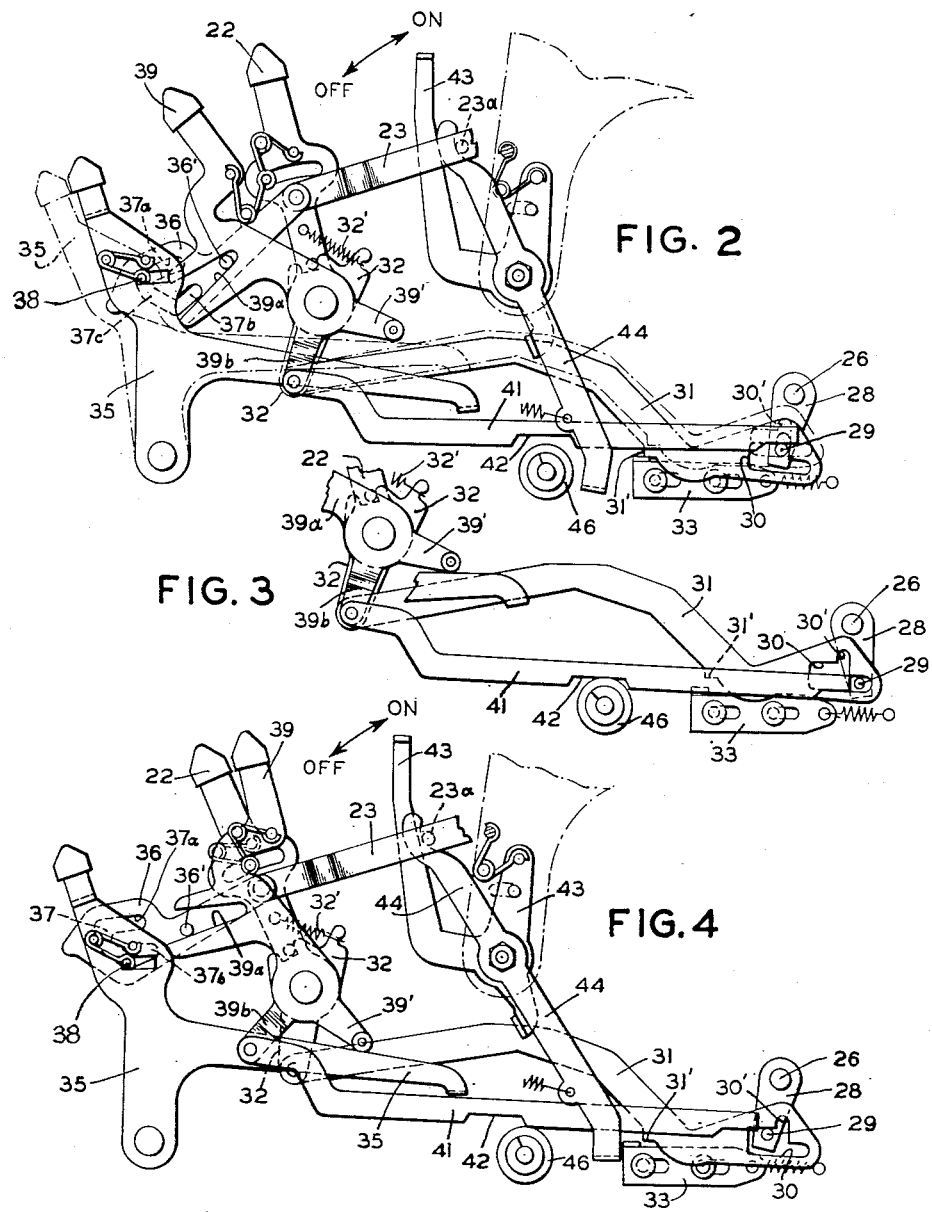

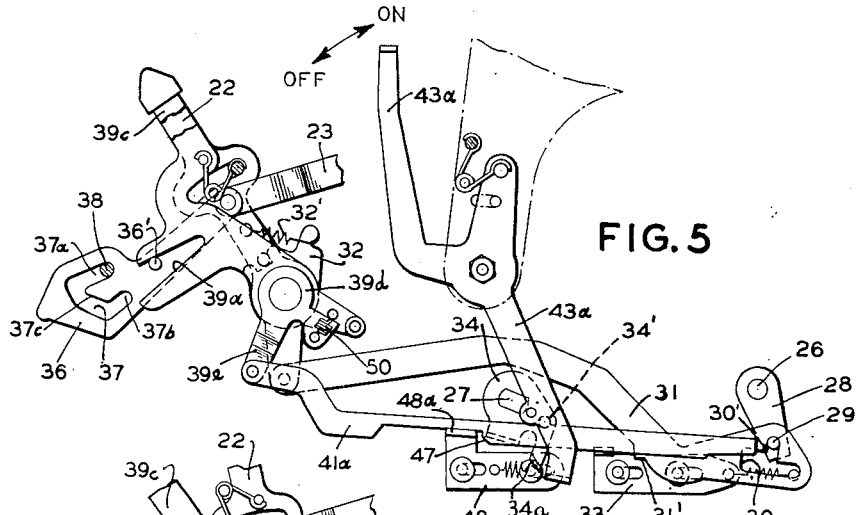
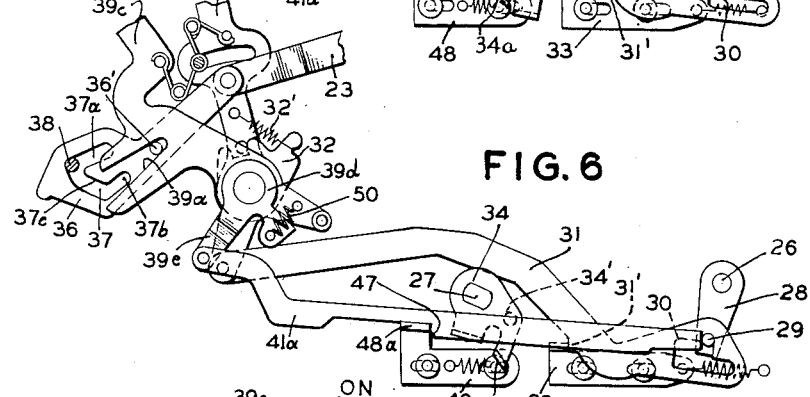
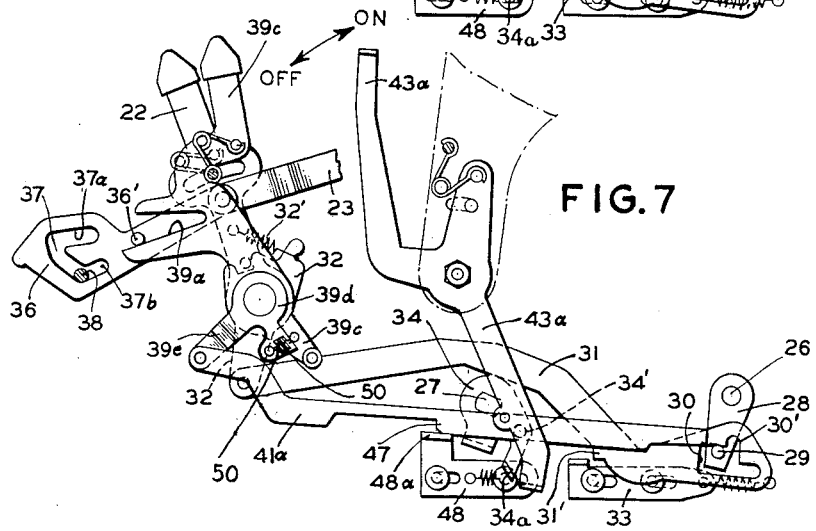

2,792,990

COUNTER CONTROL MECHANISM

Leonard S. Sepanak, Clifton, N. J., assignor to Monroe Calculating Machine Company, Orange, N. J., a corporation of Delaware Application November 5, 1953, Serial No. 390,389

8 Claims. (Cl. 235—61)

The invention relates to means for controlling the operation of register actuating mechanisms for calculating machines. More specifically, the invention relates to means for automatically adjusting a change lever for the actuator of a multiplier quotient or counter register, and particularly to such means whereby the normally effective counter actuator is rendered inoperable to effect registration during certain calculations where registration is undesirable.

Patent No. 2,531,207, issued to Herman Gang on November 21, 1950, fully discloses automatic means operable, upon initiation of a program of division, to adjust a change lever for the counter actuator so that the sign of registration in the counter register will be unlike that in the accumulator. Upon conclusion of the program of division, the change lever is automatically restored to its normal setting in which the counter actuator is adjusted to effect like sign of registration. In the performance of a program of multiplication, therefore, no automatic adjustment of the change lever is effected as its normal setting controls the counter actuator for the proper sign registration. Also, manually settable means is provided to disable the automatic change lever adjusting means so that complemental registration (like sign) may be effected in the counter register during a program of division.

As fully disclosed in Patent No. 2,631,779, issued to Howard M. Fleming and Austin A. Overbury on March 17, 1953, the counter actuator of the machine of the aforenoted Patent No. 2,531,207 is provided with an intermediate ineffective or neutral position for the reversing or direction controlling means in addition to its two direction controlling positions. The reversing means is positioned in its neutral setting by adjusting the change lever to a position intermediate its two direction controlling positions. When in neutral position, the reversing means renders the counter actuator inoperable to effect registration in the counter register.

A manipulatable control device including adjustable constraining means may be operated to adjust the change lever to its intermediate position in which no registration will be effected in the counter register during a program of multiplication or during operation in response to plus or minus bar depression following the adjustment. Upon initiation of a program of division, however, the automatic means will operate to adjust the change lever from its neutral position to its unlike sign controlling position and therefore the correct quotient will be registered in the counter register. Upon termination of the program of division, the automatic adjusting means will be ineffective to restore the change lever from unlike to like controlling position, because the constraining means will arrest said change lever in its intermediate or neutral position. From the foregoing, it will be seen that another type of operation involving registration in the accumulator register may be performed following a division operation without registration in the counter register, which, therefore, will retain the correct quotient.

The present invention provides devices automatically operable alternatively with the manually operable means of Patent No. 2,631,779 to adjust the counter register reversing means to its intermediate ineffective position at the termination of a program of division. An "on"-"off" manual control is operable to enable or to disable the devices. In specialized work entailing certain calculations, it is essential to register the complement of a quotient followed by a different registering operation without registration in the counter or multiplier quotient register. Otherwise, it is desirable that the counter actuator automatic adjusting means functions normally. In one embodiment of the invention, therefore, the devices are operable when the control is "on" only after complemental registration of a quotient. In another embodiment of the invention, the devices are invariably operable following quotient registration if the "on"-"off" control is set for "on."

Reference is made to the aforenoted Patent No. 2,631,-779 for details of mechanisms herein referred to in the following description but not described in detail, and in the accompanying drawings parts corresponding to parts illustrated in the drawings of said patent are designated by like reference numerals.

In the accompanying drawings illustrating the invention:

Fig. 1 is a right side elevation of a calculating machine with parts broken away embodying one form of the invention and showing the devices thereof in normal position.

Figs. 2, 3 and 4 are side elevational views showing the devices of the form of the invention shown in Fig. 1 in their several adjusted and operated positions.

Figs. 5, 6 and 7 are side elevational views illustrating the alternate form of the invention with the parts in their several adjusted and operated positions.

Registering mechanism

The registering mechanisms for the accumulator register comprising numeral wheels 1 (Fig. 1) and for the counter register comprising numeral wheels 2 are constructed and operate substantially in accordance with the aforenoted disclosure of Patent 2,531,207 to which reference is made for the constructional and operational details.

The actuating mechanism for accumulator wheels 1 comprises differentially settable actuators 4 and tens transfer actuators 5 mounted in and driven by transversely extending shafts 6 and 7 respectively in the body of the machine. The counter actuator, designated generally by the numeral 8 is also mounted in the body of the machine and is driven by a shaft 9. Actuator shafts 6, 7, and 9 are driven at a 1 to 1 ratio by gear train 10 from a drive gear 11 on shaft 12. Shaft 12 is driven forwardly or reversely by a reversible clutch mechanism (not shown).

Drive means for the counter actuator 8 includes reversing means which is adjustable into either of two direction controlling positions so that the counter actuator may be operated in the same or the reverse direction with relation to differential and tens transfer actuators 4 and 5 of the accumulator register. The reversing means is provided with a neutral position intermediate the two direction controlling positions whereby the counter actuator is rendered ineffective.

The reversing or direction controlling means for counter actuator 8 comprises a pair of spaced eccentrics 19 and 20 fixed on shaft 9. Eccentric 19 controls the operation to effect like sign registration; i. e., adding in the counter register when adding in the accumulator register and eccentric 20 controls the operation to effect unlike registration. Shaft 9 is longitudinally adjustable to move one or the other of eccentrics 19 or 20 into driving engagement with a fork 21 which transmits the drive to counter wheels 2, or to an intermediate position thereby locating eccentrics 19 and 20 upon opposite sides and out of engagement with fork 21 thereby rendering the counter actuator ineffective.

*The change lever*

A change lever 22 (Figs. 1, 2 and 4) pivotally mounted on the right side frame, is operable to adjust shaft 9 and direction controlling eccentrics 19 and 20 mounted thereon. A link 23 (Fig. 1) connects lever 22 with one arm of a bell crank 24. The other arm of bell crank 24 has pin engagement with a concentric groove of a collar 25 which is fixed on the end of longitudinally adjustable shaft 9. When change lever 22 is adjusted to its clockwise position (Figs. 1 and 2), bell crank 24 will be rocked to move shaft 9 toward the left of the machine and eccentric 19 into engagement with fork 21 to control the operation of counter actuator 8 for like sign registration. Conversely, when change lever 22 is adjusted to its counterclockwise position (Fig. 5) eccentric 19 will be disengaged and eccentric 20 engaged with fork 21 for unlike sign registration. Change lever 22 is held in either of the two direction controlling positions by a toggle spring and is limited to these adjustments by a fixed pin engaging an arcuate slot in said lever. As hereinbefore noted, change lever 22 is normally adjusted to its like sign controlling position (Figs. 1 and 2) unless manually adjusted otherwise as hereinafter described.

*Adjustment of change lever*

Upon initiation of a program of division, a shaft 26 is automatically rocked counterclockwise from the position shown in Figs. 1 and 2 to the position shown in Fig. 3 to effect certain adjustments controlling the program, and upon conclusion of the program, shaft 26 is rocked clockwise to normal. Furthermore, upon conclusion of the division program a shaft 27 is automatically rocked counterclockwise and returned, thereby furnishing drive means for a keyboard clearing operation. Power means and the control thereof for rocking shafts 26 and 27 is fully disclosed in the aforenoted Patent No. 2,531,207 and in the drawings of said patent, shafts 616 and 484 correspond to shafts 26 and 27 respectively of the present disclosure.

The counterclockwise movement of shaft 26 upon initiation of a program of division is utilized to adjust automatically change lever 22 to its counterclockwise unlike sign controlling position (Fig. 5) and the clockwise movement of the shaft at the conclusion of the program operates to restore automatically change lever 22 to its normal clockwise like sign controlling position (Figs. 1 and 2). These adjustments of the change lever are effected by a pin 29 at the end of a depending arm 28 fixed on shaft 26 and engaging slot 30' of opening 30 at the rear end of a link 31 which, at its forward end, has yieldable connection, comprising plate 32 and spring 32', with change lever 22.

When link 31 is in normal forward position (Figs. 1 and 2), a shoulder 31' thereof rests upon a forwardly extending lug of a slide 33 which is spring urged normally toward the rear. When link 31 is moved to the rear upon initiation of a division program, shoulder 31' will be removed from the lug of slide 33 thereby permitting said link to move downwardly and thereby bring the left edge of engaged slot 30' of opening 30 into the path of movement of pin 29. When pin 29, engaging the left edge of slot 30', restores link 31 toward the front of the machine at the termination of the program of division, shoulder 31' will engage the lug of slide 33 and likewise move said slide against the tension of its spring. As heretofore noted, at the conclusion of the division program a shaft 27 (Fig. 1) is rocked counterclockwise and returned as an incident to a keyboard clearing operation and this operation follows restoration of link 31 by pin 29 of arm 28. A collar 34 is fixed on the end of shaft 27 and at the end of a projecting arm integral therewith is a pin 34' extending inwardly below link 31. When shaft 27 is rocked counterclockwise, pin 34' will engage link 31 to move said link upwardly thereby removing slot 30' from engagement with pin 29 and permitting slide 33 to be spring moved rearwardly to position its lug beneath shoulder 31' of link 31 as shown in the full line position in Fig. 2. When the link has been adjusted to this position, manual operation of change lever 22 may be effected as the left edge of slots 30' of opening 30 will have been raised above pin 29 of arm 28.

Manual disabling means in the form of a lever 35 (Figs. 1 and 2) is provided to adjust link 31 to render the automatic means ineffective to adjust change lever 22. Thus, a complemental quotient may be registered during a program of division. Lever 35 is pivoted at its lower end to the right side frame of the machine and a toggle spring holds the lever in either ineffective clockwise position as shown in full lines (Fig. 2) or effective counterclockwise position as shown in dot-dash lines. When lever 35 is moved to effective position, a lug at the end of a rightwardly extending arm of said lever will engage and raise link 31 from the full line position (Fig. 2) to the dot-dash line position thereby removing the right edge of slot 30' above and out of the path of movement of pin 29. Therefore, when arm 28 is rocked, pin 29 will move ineffectively in opening 30.

*Manual adjustment of the change lever to intermediate position*

As heretofore noted, control devices are manually operable to adjust change lever 22 to its intermediate position thereby adjusting counter actuator 8 to ineffective position. The automatic means will operate to adjust the change lever from its intermediate position to its unlike sign controlling position upon initiation of a program of division. However, upon termination of the program of division, the automatic adjusting means will be ineffective to restore the change lever from unlike to like sign controlling position as the control devices include constraining means effective to arrest said change lever in its intermediate or neutral position.

The control devices comprise a plate 36 (Figs. 1 and 2) having a rearwardly extending arm which is pivotally mounted at its end to the point of connection of change lever 22 with link 23. A fixed pin 38 in the left side frame extends through a varidirectionally extending slot-like opening 37 in plate 36 including a non-constraining portion 37a, a constraining portion 37b, and an angularly disposed cam portion 37c connecting portions 37a and 37b at their front ends. When plate 36 is in normal counterclockwise position (Figs. 1 and 2), fixed pin 38 engages the forward end of portion 37a of slot 37. When the parts are in this position, it will be seen from an inspection of Fig. 2 that change lever 22 may be moved counterclockwise to unlike controlling position and return without interference by pin 38. When change lever 22 is in normal clockwise position (Fig. 2) plate 36 may be rocked clockwise from the position shown in Fig. 2 thereby engaging cam portion 37c of slot 37 with fixed pin 38. This operation will move plate 36 forwardly and change lever 22 attached thereto counterclockwise to the intermediate position shown in Fig. 4. Furthermore, the forward end of constraining portion 37b of slot 37 will now engage pin 38 thereby permitting forward movement of plate 36. Therefore, upon initiation of a program of division, if enabled, the automatic adjusting devices will be effective to adjust change lever 22 counterclockwise from intermediate to unlike registration controlling position. Upon termination of the program of division and the clockwise movement of change lever 22 toward like registration controlling position, the forward end of slot portion 37b will again be moved into engagement with pin 38 thereby arresting said change lever in intermediate position. However, yieldable connection 32, 32' will permit link 31 the full extent of its forward movement by pin 29. As heretofore described, link 31 will be lifted as an incident to a keyboard clearing operation, thereby moving the left edge of slot 30' of opening 30 in said link above pin 29. Spring 32', therefore, will rock plate 32 counterclockwise and move link 31 toward the rear thereby restoring the parts to normal relative position. It will be noted that when change lever 22 is in intermediate position, its toggle spring is slightly off from dead center and urges said lever lightly toward its like registration controlling position from which position it is blocked by pin 38 engaging the forward end of slot portion 37b. Therefore change lever 22 has no tendency to move to its unlike registration controlling position, from which position it is unrestrained, unless positively moved to bring its toggle spring definitely past dead center in that direction.

As fully disclosed in Patent No. 2,631,779, an operating member for manually adjusting control plate 36 comprises a lever 39 (Figs. 1, 2 and 4) which has common pivotal mounting with change lever 22 to the outside thereof. Lever 39 is held in normal counterclockwise position (Fig. 2) and in its operated clockwise position (Fig. 4) by a toggle spring. Lever 39 is provided with a leftwardly extending cam slot 39a which has oppositely disposed cam faces for engaging a pin 36' on control plate 36. Upon movement of lever 39 to normal counterclockwise position the cam slot 39a engaging pin 36' will move plate 36 counterclockwise to its non-constraining position wherein the automatic change lever adjusting means is permitted normal operation.

When it is desired that no registration be effected in counting wheels 2 during another type of calculation following a program of division, lever 39 is manually adjusted to its clockwise position (Fig. 4) and the cam slot 39a thereof will move plate 36 clockwise to the position shown in Fig. 4. Furthermore, should lever 35 be in effective counterclockwise position thereby disabling the automatic change lever adjusting means, a depending arm 39' of lever 39 will engage the rightwardly extending arm of lever 35 thus moving said lever past its dead center position so that its toggle spring may move it to ineffective position permitting link 31 to drop into position for operation by pin 29 of arm 28.

*Automatic adjustment of change lever to intermediate position*

Alternatively with the manually operable means to adjust change lever 22 to its intermediate position, the present invention provides devices automatically operable upon termination of a program of division to move said change lever to its intermediate position. These devices adjust change lever 22 to its intermediate position by means automatically operable to move manually operable lever 39 from its ineffective counterclockwise position (Fig. 2) to its effective clockwise position (Fig. 4). In the form of the invention illustrated in Figs. 2, 3 and 4, the devices are operable when the "on"-"off" control is set for "on" only after registration of a complemental quotient.

To automatically adjust lever 39, said lever is provided with a depending arm 39b. Pivotally mounted at its forward end to the end of arm 39b is a rearwardly extending interponent 41 having its rear lower free end normally positioned above pin 29 of arms 28 (Figs. 1, 2). When it is desired to register a complemental quotient followed by a different operation such as product registration without registration in the counter register, an "on"-"off" control lever 43 is positioned in the clockwise position shown in Fig. 2. Lever 43 is held in the clockwise "on" position or in the counterclockwise "off" position (Fig. 1) by a toggle spring attached to an upstanding arm thereof. A secondary lever 44 has common pivotal mounting with lever 43 and is spring biased clockwise to engage the lower arm thereof with a forwardly extending lug of a depending arm of lever 43. Therefore, levers 43 and 44 are normally rocked as a unit. At the lower free end of lever 44 is a rearwardly extending lug underlying the lower edge of interponent 41. When lever 43 is in the "on" position shown in Fig. 2 the lug of lever 44 will be positioned a distance below interponent 41 to permit it to drop into operative position as will be hereinafter described. However, when lever 43 is adjusted to its counterclockwise "off" position, lever 44 will be likewise rocked to engage the lug at its lower end with interponent 41 thereby holding it in inoperative position above and out of the path of movement of pin 29 as shown in Fig. 1. Furthermore, to adjust the devices for operation following complemental quotient registration, lever 35 will be adjusted to the dot-dash position shown in Fig. 2 thereby raising link 31 to its inoperative position as heretofore described.

Upon initiation of the program of division, arm 28 will be rocked counterclockwise to the position shown in Fig. 3 and pin 29 will move idly in opening 30 and thereupon pass to the rear of the free end of interponent 41. Interponent 41 will thereupon drop downwardly to engage a cam recess 42 in its lower edge with a limit roller 46 and to position its free rear end in the path of movement of pin 29 as shown in Fig. 3. Upon termination of the program of division and the attendant clockwise movement of arm 28 to restored position, pin 29 will engage the free end of interponent 41 thereby moving said interponent toward the front of the machine and rocking lever 39 to its clockwise operative position (Fig. 4). Thus, plate 36 will be rocked clockwise to adjust change lever 22 to its intermediate position in the manner heretofore described in connection with the manual adjustment of lever 39. Upon rearward movement of interponent 41, provision must be made to raise the free rear end of said interponent above pin 29 as shown in Fig. 4. Otherwise, it would be impossible to restore lever 39 to the normal position shown in Fig. 2 as the end of interponent 41 would be blocked from rearward movement by pin 29. This adjustment of interponent 41 is effected at the end of its forward movement by engagement of the rear edge of cam recess 42 with limit roller 46 thereby raising said interponent as shown in Fig. 4.

When a quotient is registered normally and "on" "off" lever 43 is in "on" position, the devices of the invention illustrated in Figs. 1 to 4 are disabled to adjust lever 39. Upon initiation of the program of division, link 23 will be moved toward the front of the machine from the position shown in Figs. 1 and 2 to adjust change lever 22 to its counterclockwise unlike registration controlling position. A pin 23a on link 23 is positioned to the rear of the upper end of secondary lever 44 of the "on"-"off" control devices. Therefore, upon forward movement of link 23, pin 23a will engage lever 44 which is resiliently mounted relative to lever 43 and will rock said lever 44 counterclockwise and thereby engage the lug at its lower end with interponent 41 to prevent said interponent from dropping to operative position. The devices will, therefore, be rendered ineffective to adjust change lever 22 to its intermediate position upon termination of the program of division.

The devices of the form of the invention illustrated in Figs. 5, 6 and 7 are invariably operable upon termination of a program of division to adjust change lever 22 to its intermediate position, if "on"-"off" control means are adjusted to "on." The "on"-"off" control means comprises a unitary member in lieu of lever 43 and secondary lever 44 of the previously described form of the invention. The unitary member comprises a lever 43a having a rearwardly extending lug at its lower end underlying an interponent 41a, which has pivotal attachment at its forward end with a yieldable connection to a lever 39c. Lever 39c is manually operable to move change lever 22 to its intermediate position in the manner described in connection with lever 39 of the form of the invention illustrated in Figs. 1 to 4. The yieldable connection between interponent 41a and lever 39c comprises a plate 39d having common pivotal mounting with said lever and having a depending arm 39e to which the forward end of said interponent is pivotally attached. A relatively strong spring 50 normally urges plate 39d counterclockwise (Fig. 5) to position an arm thereof against a limit pin on lever 39c.

When lever 43a is in clockwise "on" position, the devices which are operable to move change lever 22 to intermediate position at the termination of a division program remain enabled regardless of the initial setting of the change lever for normal or complemental quotient registration. The following description will be made with reference to Figs. 5, 6 and 7 of the drawings with lever 35 in clockwise position and link 31 lowered so that upon initiation of the division program and the attendant movement of arm 28 counterclockwise, change lever 22 will be adjusted from like to unlike normal quotient registration controlling position.

When the parts are in normal position (not shown), the rear free end of interponent 41a rests upon pin 29 of arm 28. On the lower edge of interponent 41a is a shoulder 47 which is normally positioned above and to the rear of a lug 48a of a slide 48 which is normally spring biased toward the rear as shown in Fig. 5. Upon counterclockwise movement of arm 28 to adjust change lever 22 to its unlike registration controlling position as an incident to the initiation of a division program, pin 29 will be moved to the rear of the free end of interponent 41a thereby allowing said interponent to drop downwardly to engage its lower edge with lug 48a of slide 48 forwardly of shoulder 47 as shown in Fig. 5. When the parts are in this position, it will be observed that the rear free end of interponent 41a is in the path of movement of pin 29. Therefore, upon clockwise movement of arm 28 upon termination of the division program, interponent 41a will be moved toward the front of the machine by pin 29 concurrently with movement of link 31 by said pin to restore change lever 22 to like registration controlling position.

At the beginning of the above described forward movement of interponent 41a by pin 29, it will be noted that plate 36 is in forward position (Fig. 5) thereby locating the rear end of slot portion 37a in engagement with fixed pin 38 whereupon said plate is restrained from clockwise movement. Therefore, lever 39c will be blocked from clockwise movement to operated position by restrained plate 36 upon forward movement of interponent 41a. However, the forward movement of interponent 41a (Fig. 6) will rock arm 39c and plate 39d clockwise relative to restrained lever 39c, thereby charging spring 50.

When change lever 22 has been restored to its like registration controlling position (Fig. 6) upon completion of the clockwise movement of arm 28, plate 36 will have been moved rearwardly to position the forward end of slot portion 37a into engagement with pin 38 thereby releasing said plate for clockwise movement by lever 39c. However, plate 36 is yet restrained by other means from clockwise movement by lever 39c to move change lever 22 counterclockwise to intermediate position. This restraint results from link 31 held in forward position (Fig. 6) by pin 29 of lever 28 engaging slot 30' of said link. Therefore, lever 22 is held in clockwise position. Nevertheless, counterclockwise movement of change lever 22 could be effected at this time if energized spring 50 were strong enough to overcome the yieldable connection 32, 32' of said change lever in addition to its toggle spring. However, the operation of the parts as disclosed in the following provides that spring 50 may be of a minimum strength.

It will be recalled that upon termination of a program of division, shaft 27 is rocked counterclockwise from the position shown in Figs. 5, 6 and 7, and return as an incident to a keyboard clearing operation; and a plate 34 is rocked with shaft 27 to engage a pin 34' thereon with link 31 thereby raising said link to disengage slot 30' from pin 29. Thus link 31 will be released for rearward movement and spring 50 will be effective to rock lever 39c clockwise from the position shown in Fig. 6 to restore it to its normal position relative to plate 39. Therefore, plate 36 will be rocked clockwise (Fig. 7) and change lever 22 will be rocked counterclockwise to intermediate position subsequent to its clockwise movement to like registration controlling position. When the above described operations are effected, pin 29 is in engagement with interponent 41a as shown in Fig. 6. Otherwise spring 50 would move said interponent toward the rear and would be ineffective to rock lever 39c.

At the completion of the above described operation, means must be provided to raise and to hold the rear free end of interponent 41a above pin 29 so that said interponent may be moved rearwardly above said pin (Fig. 7) thereby permitting lever 39c to be restored counterclockwise to normal position. The means for raising and holding interponent 41a operate as follows: Upon the forward operating movement of interponent 41a (Fig. 6), shoulder 47 thereof will engage lug 48a of plate 48 thereby moving said plate toward the front of the machine against the tension of its spring. When shaft 27 and plate 34 are rocked counterclockwise in the keyboard clearing operation, a lug 34a of a depending portion of the rightwardly extending arm of plate 34 will engage the lower edge of interponent 41a thereby raising said interponent and removing shoulder 47 thereof from engagement with lug 48a of plate 48. Plate 48 will, therefore, be spring moved toward the rear to position its lug 48a to the rear of shoulder 47 thereby holding the free end of interponent 41a raised above pin 29 when shaft 27 and plate 34 are restored clockwise. The timing of the operation of the parts is such that link 31 is raised by pin 34' to permit the aforedescribed operation of spring 50 while the end of interponent 41a is engaged by pin 29, and then upon further counterclockwise movement of shaft 27, interponent 41a is raised. When the parts are in normal position, the lug of plate 34 is a distance below interponent 41a which will permit said interponent to drop to operative position upon counterclockwise movement of arm 28.

When lever 35 is rocked counterclockwise to disable link 31 so that change lever 22 will remain in like registration controlling position for complemental registration, lever 39c will be rocked clockwise to adjust change lever 22 counterclockwise to its intermediate position upon termination of the division program concurrently with movement of interponent 41a toward the front of the machine by pin 29. During this operation, it will be apparent that spring 50 will not be charged and plate 39d and arm 39e will remain in normal position relative to lever 39c.

Reference has been made to Patent No. 2,531,207 to power means operable in connection with a program of division in a particular type of calculating machine to effect the automatic setting of the change lever. It will be understood, however, that the devices of the invention are equally adaptable for use in other types of calculating machines wherein change lever adjustment is effected by automatically operable power means or wherein such power means is available. Also, it will be obvious that the devices may be adapted to adjust a counter actuator reversing means to an ineffective position, following a machine operation prior to which said reversing means has been adjusted manually to one of two direction controlling positions. Furthermore, although the devices of the invention have been disclosed as operating automatically to adjust the change lever through the manually operable devices of Patent No. 2,631,779, it will be apparent that the invention is not necessarily restricted to use in conjunction with such manually operable devices nor to disablement of the counter actuator directly through the change lever. Also, applications of the invention other than those herein referred to wherein it is desired to disable the counter actuator may appear to those skilled in the art. It will be understood, therefore, that the invention is not to be restricted except as required by the spirit of the appended claims.

I claim:

1. In a motor driven calculating machine having an accumulator register, a counter register, and drive means for said counter register including reversing means adjustable into either of two direction controlling positions or into an intermediate ineffective position; the combination of power operated means for adjusting said reversing means to one of said controlling position upon initiation of a machine operation involving registrations in said accumulator register and upon termination of said machine operation for adjusting said reversing means to the other of said controlling positions, a second power operated means including a member adjustable to enabling or to disabling position for adjusting said reversing means to its intermediate position subsequent to its adjustment to said other controlling position, and manually settable means for controlling the adjustment of said member.

2. In a motor driven calculating machine having an accumulator register, a counter register and drive means for said counter register including reversing means adjustable into either of two direction controlling positions or into an intermediate ineffective position; the combination of power operated means including a member adjustable to enabling or to disabling position for adjusting said reversing means to one of said controlling positions upon initiation of a machine operation involving registrations in said accumulator register and upon termination of said machine operation for adjusting said reversing means to the other of said controlling positions, manually operable means for controlling the adjustment of said member, a second power operated means including a member adjustable from enabling to disabling position upon operation of the first said power operated means for adjusting said reversing means to its intermediate position upon termination of said machine operation, and manually settable means for controlling the adjustment of the member of said second power operated means.

3. In a motor driven calculating machine having an accumulator register, a counter register and drive means for said counter register including reversing means adjustable into either of two direction controlling positions or into an intermediate ineffective position; the combination of power operated means including a member adjustable to enabling or to disabling position for adjusting said reversing means to one of said controlling positions upon initiation of a machine operation involving registrations in said accumulator register and upon termination of said machine operation for adjusting said reversing means to the other of said controlling positions, manually settable means for controlling the adjustment of said member, a second power operated means for adjusting said reversing means to its intermediate position subsequent to its adjustment to said other controlling position and alternatively upon termination of said machine operation including a member adjustable to enabling or to disabling position, and manually settable means for controlling the adjustment of the member of said second power operated means.

4. In a motor driven calculating machine having an accumulator register, a counter register, and drive means for said counter register including reversing means adjustable into either of two direction controlling positions or into an intermediate ineffective position; the combination with power means operable upon initiation and upon termination of a machine operation involving registrations in said accumulator register, and a drive train operable by said power means upon initiation of said machine operation to adjust said reversing means to one of said controlling positions and, upon termination of said machine operation, to the other of said controlling positions; of a second drive train including a resilient connection operable by said power means to adjust said reversing means to its intermediate position subsequent to its adjustment to said other controlling position, a member in said second drive train adjustable to render said power means effective or ineffective, and manually settable means for controlling adjustment of said member.

5. The invention according to claim 4 wherein the second drive train includes a portion of said first drive train.

6. The invention according to claim 4 wherein the first said drive train includes a member adjustable to enabling or to disabling position and a manually settable member for controlling adjustment of said member.

7. The invention according to claim 4 wherein the adjustable member in said second drive train comprises an interponent adjustable upon initiation of said machine operation from an ineffective position to a position to render said power means effective.

8. In a motor driven calculating machine having an accumulator register, a counter register and drive means for said counter register including reversing means adjustable into either of two direction controlling positions or into an intermediate ineffective position; the combination of power means operable upon initiation and upon termination of a machine operation involving registrations in said accumulator register, a drive train adjustable to enabled or disabled position operable by said power means upon initiation of said machine operation to adjust said reversing means to one of said controlling positions and upon termination of said machine operation to the other of said controlling positions, manually settable means for controlling adjustment of said drive train, a second drive train adjustable to enabled or disabled position operable by said power means upon termination of said machine operation to adjust said reversing means to its intermediate position, and manually settable means for controlling adjustment of said second train.

References Cited in the file of this patent

UNITED STATES PATENTS

| | | |
|---|---|---|
| 2,393,019 | Avery | Jan. 15, 1946 |
| 2,631,779 | Fleming et al. | Mar. 17, 1953 |